United States Patent [19]
Larkey et al.

[11] Patent Number: 5,824,229
[45] Date of Patent: Oct. 20, 1998

[54] FILTRATION OF ROLLING SOLUTIONS

[76] Inventors: James G. Larkey, 18 Elora Drive, Hamilton, Ontario, Canada, L9C 7J1; Richard E. Bowering, 3170 Pine Meadow Drive, Burlington, Ontario, Canada, L7M 2Z6; John Dragasevich, 38 Richbourne Court, Scarborough, Ontario, Canada, M1T 2T6; Yitzhak Orlans, 4210 Grand Ave., Ojai, Calif. 93023

[21] Appl. No.: 632,538

[22] Filed: Apr. 19, 1996

[51] Int. Cl.⁶ .......................... B01D 37/00; B01D 29/68
[52] U.S. Cl. .......................... 210/741; 210/791; 210/798; 210/90; 210/108; 210/409; 210/411
[58] Field of Search .................... 210/741, 791, 210/797, 798, 103, 108, 409, 411, 90, 413

[56] References Cited

U.S. PATENT DOCUMENTS

| | | | |
|---|---|---|---|
| 3,168,467 | 2/1965 | Dreyer. | |
| 4,692,247 | 9/1987 | Orlans | 210/314 |
| 4,859,335 | 8/1989 | Whyte | 210/411 |
| 5,164,079 | 11/1992 | Klein | 210/408 |
| 5,198,111 | 3/1993 | Davis | 210/408 |

*Primary Examiner*—Robert Popovics
*Attorney, Agent, or Firm*—Shlesinger Arkwright & Garvey LLP

[57] ABSTRACT

Rolling solutions used in cold rolling are pressurized and filtered at working temperature using a filter of the scanning flush type in which flushing nozzles exhausting to a low pressure zone are scanned over an upstream surface of the filtration medium during flushing cycles triggered by a pressure drop across the filter exceeding a predetermined level. Flushing retentate exhausted during the flushing cycles is treated in a secondary filter. Harmful particulates can be removed without retaining wanted components of the rolling solution.

8 Claims, 2 Drawing Sheets

FILTRATION OF ROLLING SOLUTIONS

BACKGROUND OF THE INVENTION

1. Field of the Invention

This invention relates to the filtration of solutions used in the cold rolling of materials, particularly steel.

2. Description of the Prior Art

Customers for cold rolled steel products, particularly those used in automotive applications, have increasingly less tolerance of surface imperfections such as pitting. One substantial factor in the occurrence of pitting is the presence of particulates in solutions applied during the rolling process. Such particulates are of various kinds, and include steel particles from the surfaces of rolls and from the steel being rolled, as a result of the extremely high deformations that occur during cold rolling, wood slivers and other material from the guides used to keep the steel on track during rolling, and mill dirt and colloidal accumulations from clean-up materials, sludge buildups, molecular adherence, precipitates and other sources.

Conventionally, steel mill rolling solutions have been collected in large holding tanks to promote settling of particulates, followed by sidestream treatment of the solutions with conventional filtration technologies using, for example, filter cloths. In order to obtain sufficient removal of ferrous particles from the solutions, it has often been necessary to use expensive magnetic separation techniques to supplement conventional filters. Such systems are bulky, capital-intensive and costly to operate. The goal of such systems is to ensure that no particulate of a size greater than about 100 microns is present in the solutions returned for re-use in the mill. Attainment of this objective results in reduction of pitting in the surface of the steel, enhanced product quality and improved roll life and solution life, and is a prerequisite of proper operation of flatness control systems. Savings result not only from reduced top up requirements for rolling solutions, but also from reduction in the costs of disposing of discarded solution, The rolling solutions are typically quasi-stable emulsions, usually containing a high percentage of animal fat and lesser amounts of fatty acids, mineral oils, corrosion inhibitors, emulsifiers and other ingredients. In some mills, a detergent solution is used on the last roll stand to lubricate and clean the steel surface and provide so-called clean steel. The solutions are typically used at temperatures of 50° C. to 60° C., but temperature may range from 40° C. to 90° C. on occasion. Such conditions adversely affect the reliability of normal filtration equipment components, and accordingly most filtration equipment cannot be placed close to the rolling mill since the rolling solution must be cooled before it can be filtered. Ideally however it would be desirable to locate the filtration system as close as possible to the rolling mill as to be able to filter the solution continuously and without the necessity for cooling (and subsequently re-heating. The components in solution during actual rolling are a function of temperature and agitation, and it would therefore be desirable to duplicate these conditions when filtering the solutions, otherwise undesirable modification or separation of components of the solutions may occur. It would also be desirable to be able to flush the filter media used in processing the solutions because it eliminates the waste that results from periodic disposal of filter media, and solution contained therein. Performance requirements for filters used in this application are stringent, since the particulate to be removed is diverse both in composition and particle size, As well as iron or steel particles, dust and mill dirt particles, the solutions to be cleaned may contain piece of wood and other consumables used during the cold rolling process.

Any filter flushing system must accommodate this range of particulates, and should also avoid, if possible, any periods in which either the filtration system or the mill itself must be disabled in order to service it, since the cost of downtime on cold rolling mills is very high.

Additionally, maintenance of the integrity of the rolling solutions themselves through the turbulence and velocities involved in high volume straining is necessary. For example, long-chain molecular compounds utilized in the solutions must remain intact to provide the lubricity required for keeping mill power consumption and roll life at acceptable levels. Conventional filters, if fine enough to retain damaging particles, have a tendency as particulate matter builds up in the filter media to retain also such desirable components of the rolling solution. It is for this reason that current high performance filtration systems tend to use relatively coarse filtration supplemented by magnetic separation.

SUMMARY OF THE INVENTION

It is an object of the present invention to provide a filtration system for rolling solutions utilized in cold rolling mills which addresses the above problems and requirements without the necessity for utilizing magnetic separation techniques to remove fine ferrous particles.

According to the invention, a method of filtering a body of rolling solution used in a cold rolling mill comprises passing the solution under pressure through a filter element while monitoring back pressure across the filter element, activating a scanning flushing system presenting flushing nozzles to an upstream side of the filter element to execute a scanning cycle for flushing successive minor portions of said filter element, in response to increase of said back pressure above a predetermined level, the nozzles being connected so as to remove particulates to an exhaust outlet without a substantial reduction of total flow through said filter element during said flushing cycle. Preferably retentate from the scanning flushing system is separately filtered to recover solution from the retentate.

The invention also extends to apparatus for carrying out the above method, and more specifically to apparatus for filtering a body of rolling solution used in a cold rolling mill, comprising means to strain particles above a predetermined maximum size from solution drawn from said body, means to pressurize said solution, a filter casing divided into inner and outer chambers by a cylindrical filter mesh selected to capture particles having a minimum size between 25 and 300 microns, the filter casing receiving solution into the inner chamber from said pressurizing means, and the outer chamber of the filter casing being connected to an output conduit, at least one flushing nozzle mounted for movement in a spiral path about a longitudinal axis of the cylindrical filter mesh within said inner chamber so as to scan an inside surface of the cylindrical filter mesh, an exhaust valve connected to said of least one nozzle, a motor operative to move said at least one flushing nozzle along said spiral path to scan the filter mesh, and means responsive to a predetermined pressure difference between said inner and outer chambers to open said exhaust valve and activate said motor to scan the filter mesh, the at least one nozzle being of sufficient diameter and providing sufficient clearance from the mesh to permit the passage of particles passing through said strainer through said nozzle and said exhaust valve but of sufficiently restricted dimensions that only a minor proportion of the solution from the pump is diverted through the exhaust valve.

Further features of the invention will become apparent from the following description of a presently preferred embodiment.

DESCRIPTION OF THE PREFERRED EMBODIMENT

Figure 1:
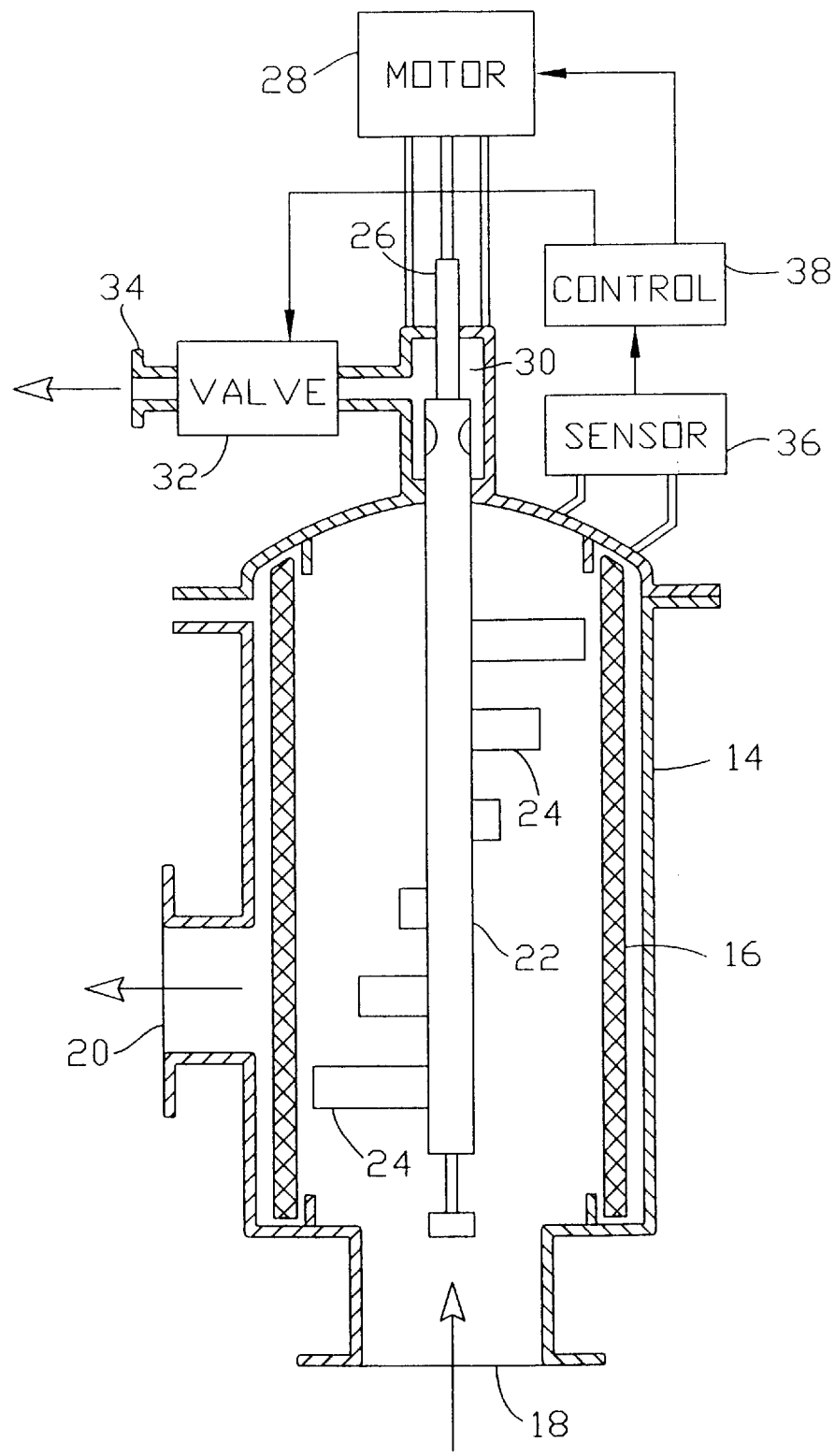
FIG. 1 is a diagrammatic cross-sectional view of a filter unit used in a filtration system according to the invention.
Figure 2:
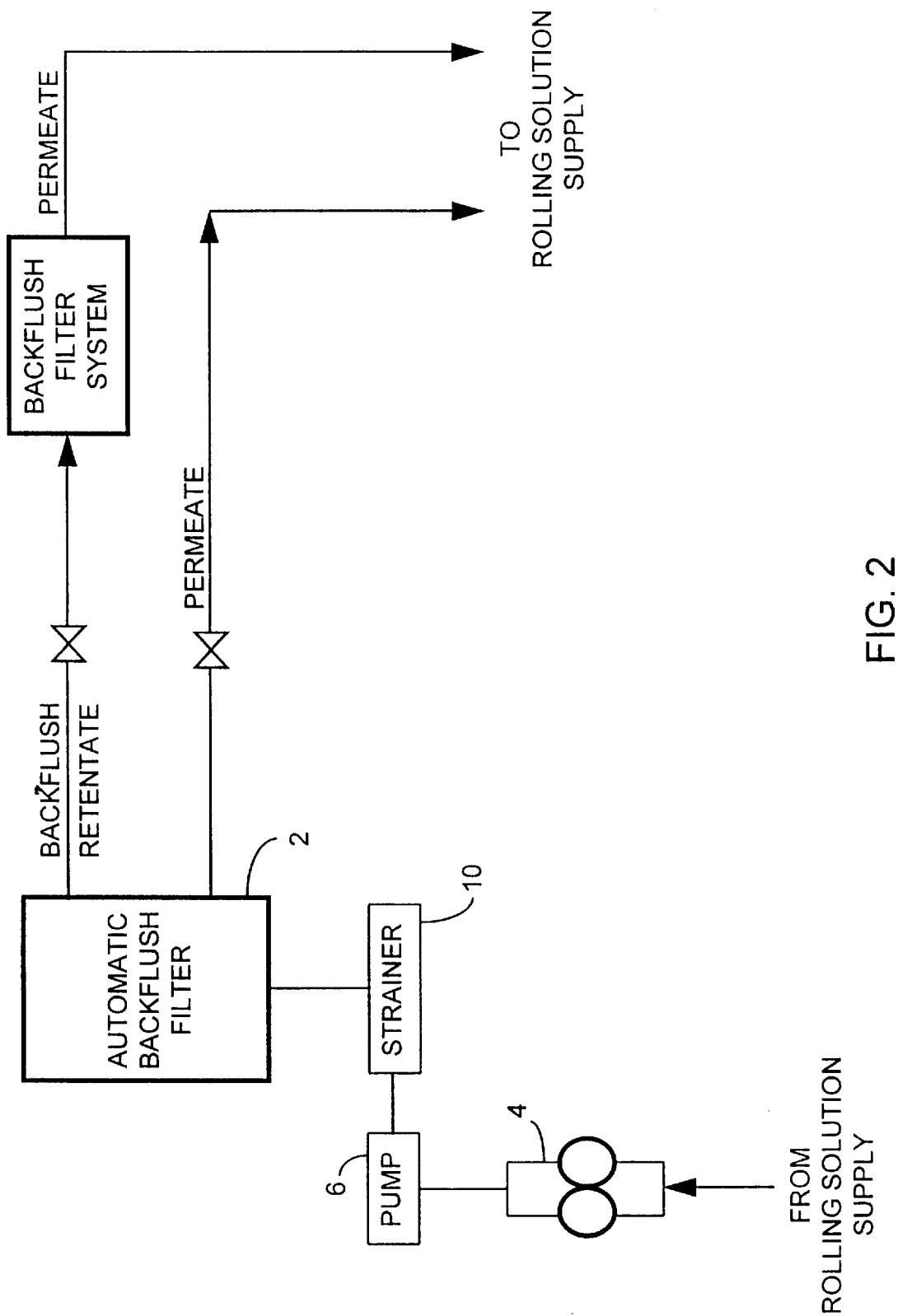
FIG. 2 is a schematic diagram of the filtration system.

In the drawings, FIG. 1 shows diagrammatically a filter 2 with an automatic flushing cycle used in the system of FIG. 2. Referring to FIG. 2, rolling solution from a supply reservoir associated with a rolling mill (not shown) is passed through a prescreen 4 and pressurized by a pump 6 for application to the filter 2. A further prescreen 10 may be located between the pump and the filter 2. Permeate from the filter 2 returns to the mill, or a supply reservoir associated with it, and flushing retentate from the filter 2 may also be applied to a filter system 8 to recover residual rolling solution for return to the mill or supply reservoir.

Referring to FIG. 1, the filter 2 is preferably of a type available from Amiad U.S.A. Inc. and constructed generally as described in U.S. Pat. No. 4,692,247. A generally cylindrical filter housing 14 supports a cylindrical filter element 16 (described further below) in a chamber having an axial inlet 18 and peripheral outlet 20 so that solution passes radially outwardly through the filter element. A pipe 22 concentric with the axis of the chamber carries at least one and normally several radially extending nozzles 24 terminating a predetermined distance short of an inner surface of the filter element 16. The pipe 22 and its associated nozzles 24 may be rotated and moved axially by a screw and nut drive 26 powered by a motor 28. The pipe 22 is closed at its bottom end and opens at its top end into a chamber 30 connected by a valve 32 to an outlet 34.

A sensor 36 monitors the pressure difference across the filter element and provides an input to a control unit 38 controlling the valve 32 and the motor 28, which remain respectively closed and off while the pressure difference is below a predetermined value.

In use, solution to be filtered is pumped into the filter 2 through the filter element 16 and leaves through the outlet 20. In a typical case, the incoming solution is maintained at a pressure of at least about 40 psig, and the medium of the filter element 16 is such that the pressure drop across it represents only a small fraction of this pressure, not more than, for example 7 psi. As particulate matter builds up on the medium of element 16, the pressure drop across the filter element, which is initially very low, will rise and when it reaches a predetermined level as detected by sensor 36, the control unit opens the valve 32 and starts the motor 28. The outlet 34 is substantially at atmospheric pressure so that when the valve 32 opens, the pressure at the nozzles 24 drops substantially below that in the chamber 14, both inside and outside the filter element 16. The resulting flow of solution into the nozzles 24 causes particulate on adjacent portions of the filter to be flushed into the nozzles. At the same time the motor rotates the pipe 22 and the screw and nut drive causes the pipe to move axially through a distance determined by limit switches (not shown) which also serve to reverse the motor at limits of the axial motion of the pipe 22. The flushing operation continues until the pressure drop across the filter element drops to a level corresponding to a substantially clean filter, whereafter the motor is stopped at the next limit switch operation. The movement of the pipe 22 causes the nozzle to scan the inner surface of the element 16 so as to flush it, the nozzles 24 being calibrated so that only a small proportion of the total body of rolling solution passes through the valve during each flushing cycle. Typically this proportion will be of the order of 1%. The nozzles should be formed of wear resistant material, for example, stainless steel.

The flushing retentate from the outlet 34 is passed to the secondary filter system 8 to recover its solution content which is returned to the rolling solution supply as shown in FIG. 1. The secondary filtration system may be a gravity or vacuum filtration system.

Particles which pass the strainers 4 & 10 must be able to pass from the inlet 18 to the out let 34, which means that when captured on the filter element 16, hey must be able to pass through the nozzles 24. Such particles ay include relatively large splinters of wood, as mentioned above, which may be of elongated form and have a tendency to "staple" into conventional filters, rendering them difficult or impossible to remove. The clearance between the surface of the screen element media and the nozzles must be sufficient to allow such particles arrested by the filter media to pass under the nozzles, and he nozzles must be dimensioned so that the flow of solution into the nozzles can carry the particles into the nozzle. Initial tests have used round nozzles, but it appears that nozzles elongated in the axial direction may also provide good results. It is unexpectedly found that the stapling phenomenon can be largely eliminated by use of the present invention. This may be because the flushing technique used tends to pull the splinters out of the filter medium, rather than pushing them as occurs in conventional reverse flow backwashing.

The element 16 consists of multiple concentric layers of filter media, of which at least the external layers are in the presently preferred elements of dutch weave stainless steel mesh. The element is designed to pass particles less than a size selected the range from about 25 micron to about 300 microns. A presently preferred range is 75 micron to 200 microns. The size selected should be such as to remove particles large enough to prejudice product quality targets, but not so small as to remove wanted constituents from the solutions. We have found that filter media of this type available from Amiad USA Inc. provide very satisfactory performance.

It is found that the system of the invention is unexpectedly successful in removing ferrous particles from rolling solutions, thus obviating the necessity for expensive magnetic separation treatments, and that secondary filtration of the flushing retentate enables substantially complete recovery of the rolling solution It is believed that the frequent flushings enable a filter element to be used which is sufficiently fine to retain damaging ferrous particles without build up on the filter resulting in removal of wanted components of the solution. The frequency of flushing cycles can be set by adjusting the pressure difference across the filter at which flushing commences. This should be low enough to avoid unduly raising the quantity of flushing retentate to be treated. Operation of the filter at the working temperature of the solutions also contributes to maintaining solution intensity.

The system has been found to operate effectively in a system in which it sidestream filters the rolling solution at a rate equal to about 30% of the throughput of the mill, but the effectiveness of the system may make it practicable to filter higher proportion of the flow or even to carry out full flow filtering if this is required to provide high filtering performance in specific applications. The filter unit 2 is constructed using materials that can withstand the normal range of working temperature of the solution to be filtered.

We claim:

1. A method of filtering a body of rolling solution used in a cold rolling mill, comprising the steps of:

(a) passing the solution under pressure through a filter element while monitoring back pressure across the filter element (b) while continuing step (a) activating a scanning flushing system presenting at least one flushing nozzle to an upstream side of the filter element to execute a flushing cycle for flushing successively scanned minor portions of said filter element in response to increase of said pressure above a predetermined level; and (c) connecting the nozzle to an exhaust outlet while the scanning filter system is active so as to remove particulates to the exhaust outlet without substantial reduction of total flow through said filter element during said flushing cycle.

2. A method according to claim 1, wherein the solution is filtered at substantially the same temperature at which it is used in the rolling mill.

3. A method according to claim 1, wherein the solution is passed through a strainer prior to filtering to remove particles too large to pass through the flushing system.

4. A method according to claim 1, wherein the filter mesh is in the form of a cylinder, the used solution is applied to an inner surface of the cylinder, and the flushing system employs at least one nozzle extending radially from the axis of the cylinder into proximity to the cylinder, and connected to an exhaust valve, a flushing cycle being initiated by opening the exhaust valve and scanning the at least one nozzle over the inner surface of the cylinder in a spiral path.

5. A method according to claim 4, wherein the at least one nozzle is spaced from the cylinder by a distance sufficient to pass particles of the largest size admitted by the strainer, and has itself dimensions sufficient to pass such particles.

6. A method according to claim 1, wherein the filter mesh is selected to capture particles having a minimum particle size between 25 microns and 300 microns.

7. A method according to claim 1, wherein the filter mesh is selected to capture particles having a minimum particle size between about 75 microns and about 200 microns.

8. Apparatus for filtering a body of rolling solution used in a cold rolling mill, comprising;

(a) means to strain particles above a predetermined maximum size from solution drawn from said body;

(b) means to pressureize said solution;

(c) a filter casing and a cylindrical filter mesh dividing the casing into inner and outer chambers, the cylindrical filter mesh being selected to capture particles having a minimum size between 25 and 300 microns, the filter casing receiving solution into the inner chamber from said pressurizing means;

(d) an output conduit connected to the outer chamber of the filter casing;

(e) at least one flushing nozzle mounted for movement in a spiral path about a longitudinal axis of the cylindrical filter mesh within said inner chamber so as to scan an inside surface of the cylindrical filter mesh;

(f) an exhaust valve connected to said at least one nozzle;

(g) a motor operative to move said at least one flushing nozzle along said spiral path to scan the filter mesh; and (h) means responsive to a predetermined pressure difference between said inner and outer chambers to open said exhaust valve and activate said motor to scan the filter mesh;

the at least one flushing nozzle being of sufficient diameter and providing sufficient clearance from the mesh to commit the passage of particles passing said strainer through said nozzle and said exhaust valve, but of sufficiently restricted dimensions that only a minor proportion of the solution from the pump is diverted through the exhaust valve.

\* \* \* \* \*